Figure 3:
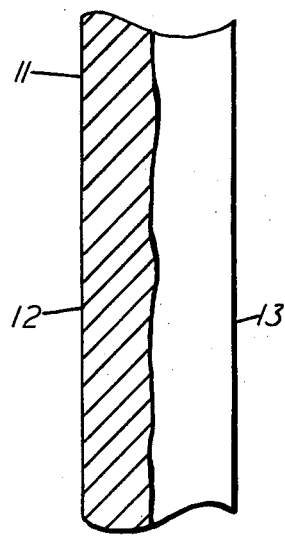

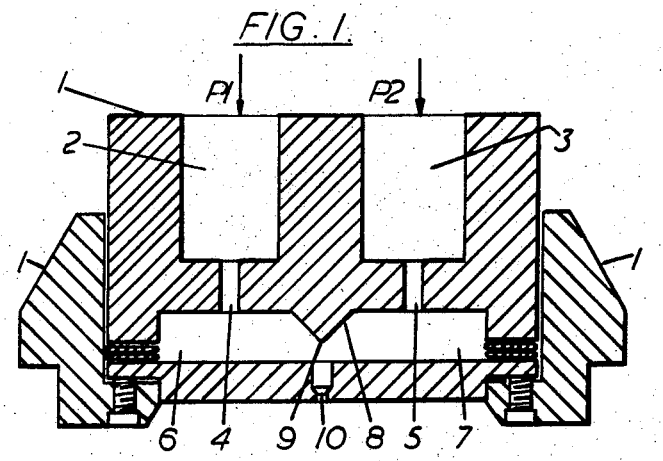
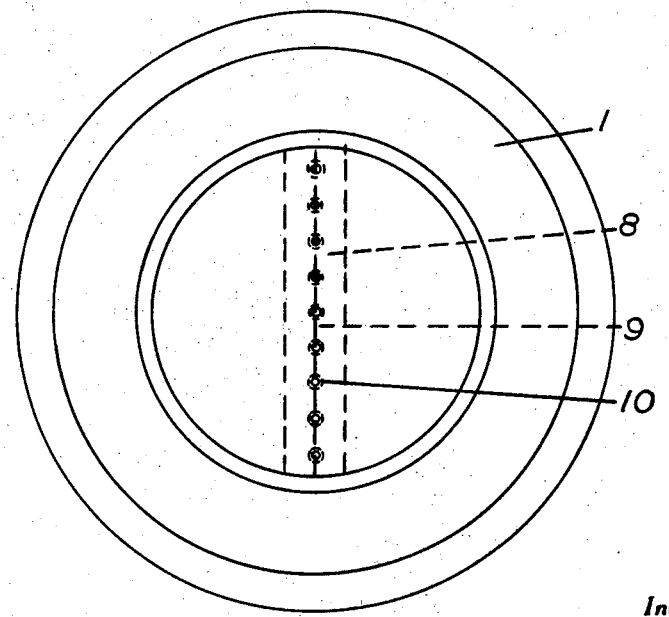

United States Patent Office 3,192,295
Patented June 29, 1965

3,192,295
PROCESS FOR THE MANUFACTURE OF SPONTANEOUSLY CRIMPING COMPOSITE FILAMENTS
Walter G. Settele, Lucerne, Switzerland, assignor to Societe de la Viscose Suisse, Emmenbrucke, Switzerland, a Swiss body corporate
Filed Feb. 19, 1962, Ser. No. 173,894
Claims priority, application Germany, Feb. 22, 1961, S 72,671
4 Claims. (Cl. 264—171)

The present invention relates to the manufacture of spontaneously crimping composite filaments and includes also the crimped filaments.

The term "spontaneously crimping" as used in the present specification describes the property of the filaments of crimping spontaneously immediately after having been stretched, or having been stored for some time on bobbins etc., as soon as the tension is taken off the filaments. No special treatment such as swelling, shrinking or heating is required to bring about spontaneous crimping.

Various processes for the manufacture of crimped fibres are known which impart to the fibres a heterogeneous structure and in which at the same time at least two materials are spun through a common spinneret orifice while being prevented from complete homogenisation, and the filaments are then subjected to a stretching and/or shrinking operation. The two materials making up the monofil may lie side by side or one may form the shell and the other the core in the cross-section. The prerequisite for the success of all such processes for the manufacture of so-called composite filaments is that the two materials should not tend to separate.

United States specification No. 2,439,814 describes composite filaments consisting of viscose, proteins, cellulose ethers and esters, polyamides and polyvinyl compounds in which the filament after spinning, is stretched beyond the elastic limit of at least one of its constituents. When such filaments are made by spinning polymer solutions, various properties of the constituents may be different, for example type and molecular weight of polymer, viscosity of the solution, etc. However, filaments manufactured in this manner possess only a potential crimping capacity and the actual crimp must be developed by a treatment with water, by swelling or heating.

United States specification No. 2,439,815 describes the manufacture of composite fibres whose constituents lie eccentrically side by side, the plasticised filaments being stretched and the crimping being developed by a heat treatment.

British specification No. 805,033, French specification No. 1,124,921 and United States specification No. 2,931,091 describe the manufacture of potentially crimpable composite filaments, especially by a melt spinning process, the two polymer constituents being disposed eccentrically over the cross-section of the fibre. They differ from the previously known composite filaments in that two polymers having different shrinking and recovery properties are used. Inter alia, there is further described the manufacture of crimpable composite yarns of polyesters and polyamides by melt spinning through one and the same spinneret orifice and then stretching the filament so formed at room temperature or at a temperature that is no higher than 70° C. below the point at which the lower-melting constituents melts. However, these composite filaments do not crimp spontaneously, and the crimp has to be developed by a shrinking treatment. Thus this type of filament too is only potentially crimpable.

According to another process, described in French specification No. 1,205,162, wool-like fibres can be manufactured by spinning together two different polymers one of which has a small content of ionic compounds, the crimp then being developed, after the usual operations, by a swelling treatment.

A feature common to all the above processes and the products obtained by them is that after spinning and stretching the filament is invariably only potentially crimpable, the crimp materialising only after a shrinking treatment, such as swelling, moistening and heating the filament in the slack state.

Another process, described in French specification No. 1,217,973, relates to the manufacture of filaments of different glass compositions having different coefficients of expansion and welded together in the longitudinal direction. These undergo spontaneous crimping on cooling. It is claimed that this process is also suitable for the manufacture of crimped fibres of different organic polymers, but no mention is made of the manner in which such a process is to be carried out. Nor is there any reference to the stretching of the solidified filaments; all that is described is the drawing down of the filament before it has cooled and solidified.

All the afore-mentioned specifications contain at most only scanty details concerning the features "take-up" and "half-value decrimping energy" which characterise the crimp of the crimped filaments. For the purpose of the present specification, the terms "take-up," "half-value decrimping force" and "number of loops" have the following meanings.

"Take-Up," "TU" for short:

$$TU = \frac{L-S}{L} \times 100$$

where L is the measured length of a piece of filament in the stretched state under a tensional force just sufficient to take the crimp out without as yet drawing upon the inherent elasticity of the filament, and S is the length of the same piece of filament in the slack state.

"Half-value decrimping force" is the force expressed in mg. per denier that is required to stretch the filament by 50% of the length constituting the difference between the fully stretched and the unstretched filament, that is to say $$\frac{L-S}{2}$$

where L and S have the same meanings as above. In actual practice this force is determined by plotting a force/elongation diagram over the distance S-to-L, and the coordinates for the mean values of the length are then read off the diagram.

"Number of loops" is the number of loops of the crimped composite filament per cm., referred to the length L of the stretched filament.

It has now been found that it is possible to manufacture from certain thermoplastic organic polymers, spun from the melt side by side, useful spontaneously crimping filaments when such filaments, being composites of different polymers welded together in the longitudinal direction, are stretched while being heated.

The present invention provides a process for the manufacture of spontaneously crimping composite filaments made of one constituent which is a polyamide and of another constituent which is a different polyamide or a polyester. The said constituents are spun from their melts simultaneously and side by side through common spinneret orifices and the spun filaments are then stretched at a temperature of 60° C. or less below the point at which the lower-melting constituent melts. An advantageous embodiment of the present process is to allow the filaments to crimp in the slack state and to heatset then in that state.

The invention includes also the spontaneously crimping composite filaments obtained by the process described above, more especially such as have a "take-up" of at least 30% and a "half-value decrimping force" of at least 1.0 mg. per denier. These crimping characteristics correspond approximately to the lowest values obtained in continuous crimped polyamide yarns manufactured by means of a stuffing box crimper and then setting them or by high twisting, fixing and backtwisting the yarns.

By subjecting the slack, crimped filaments to heat-setting, the "half-value decrimping force" can be substantially increased, where this is desired.

The present process is suitable for the manufacture of continuous monofils or multifils or staple fibres.

Starting materials suitable for use as the polyamide constituents are, for example, polyhexamethylene adipamide (nylon 66), polycaprolactam (nylon 6), polyhexamethylene sebacic amide (nylon 610) and polyamide-undecanoic acid (nylon 11). In the composites of the invention which consists exclusively of polyamides, two polyamides of different chemical composition, for example polyhexamethylene adipamide and polycaprolactam, are used and should lie side by side in the longitudinal direction of the filament.

As polyester constituents polyethylene terephthalate, copolyesters of ethylene terephthalate and ethylene isophthalate, or polyesters of terephthalic acid and di(hydroxy-alkyl)cyclohexane are, for example, suitable.

A prerequisite for the suitability of the said polymers for use in the present process is that the constituents must not separate from each other.

The spontaneously crimping composite filaments of the invention can be spun with the aid of known devices in which the two thermoplastic constituents are extruded through common spinneret orifices. When spinning according to the present invention it is possible to maintain, even over prolonged spinning periods, a controlled distribution of the two constituents over the cross-section of the composite filament, without mixing them from start to finish of the spinning operation.

The proportions of the two constituents in the composite filament can be varied by suitably setting the delivery rate of the titre pumps. The line of contact of the two constituents, as seen in the cross-section of the fibre, may be straight or bent and run along the axis of the fibre or be at a certain distance from it. In the limiting case the two constituents may take up symmetrical positions.

The filaments can be modified in a variety of ways by adding to one constituent or both constituents matting agents, coloured pigments, stabilisers, softening agents or the like.

The heat-stretching can be performed by any one of the suitable known methods used singly or in combinations. The filament may be heated, for example, by means of heated feed rollers, stretching pins, heating surfaces or small heating tubes.

The heat-setting according to the invention of the filaments in the slack state can be performed immediately after the stretching or at any other subsequent stage of the manufacture.

The crimp effect of the filaments manufactured by the present process is three-dimensional, and sometimes even a double-spiral effect is observed. The crimp disappears when a high tensional force is applied to the filament but reappears spontaneously when this force is taken away. The crimp developed in the filaments is stable to storage even when the filaments are wound under high tension. When the tensional force is taken off, the filaments recover their crimp.

The crimped filaments of the invention can be dyed, treated and finished like the known crimped fibres. In these operations the filaments should be treated in as slack a state as possible to avoid impairing the crimp.

The appearance of the filaments of the invention is similar to that of continuous filaments crimped by false-twisting, untwisting-and-backtwisting, compression or other methods. They are distinguished by their considerable elasticity and fullness of handle. These filaments and staple fibre yarns made therefrom are suitable for weaving and knitting a wide variety of textile materials. For example, when such filaments are woven under tension, smooth fabrics are obtained which contract in the detensioned state. In this manner it is possible to modify the texture and the handle and to achieve considerable fullness, heat retention and covering power. The new filaments are likewise suitable as pile for carpets.

The following examples illustrate the invention.

The term "reduced viscosity" used in the examples is computed from the equation:

$$\text{Reduced viscosity} = \frac{\ln \eta_{\text{rel}}}{c}$$

where in the case of polyamides $\eta_{\text{rel}}$ is the relative viscosity of a solution having a concentration $c=0.2$ gram of polyamide per 100 cc. solution, measured at 20° C. The solvent used is sulphuric acid of 94% strength; in the case of polyesters $\eta_{\text{rel}}$ is the relative viscosity of a solution having a concentration $c=0.2$ gram of polyester per 100 cc. solution, measured at 20° C. The solvent used is a 1:1 mixture of phenol and tetrachloroethane.

Figure 4:
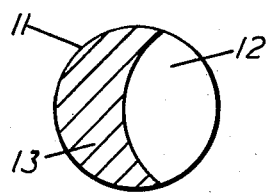

The composite filaments referred to in the following examples were spun by means of the device shown in the accompanying drawings, where FIG. 1 represents a cross-sectional view of the device, FIG. 2 is an elevation of the spinning device as seen from the side carrying the spinneret orifices, FIG. 3 is a longitudinal view, partly sectioned, of a composite filament, and FIG. 4 is a cross-section through a composite filament.

In FIG. 1, 1 represents the spinning device the interior of which is subdivided into two chambers 2 and 3 into which the molten polymers $P_1$ and $P_2$ are injected by means of one titre pump for each (not shown in the drawing); if desired filters may be provided downstream of the pumps. Through orifices 4 and 5 the two melts enter the chambers 6 and 7 and each contacts one side of the partition 8 which tapers off into an edge 9 in the vicinity of the spinneret orifices. Along this edge 9 the two polymers melts $P_1$ and $P_2$ meet and flow together, without mixing, through the spinneret orifices 10.

The edge 9, as used in the preferred variant of the process for the manufacture of composite filaments described in the following examples, is disposed vertically above the centre line of the associated spinneret orifices 10. Alternatively, the same result can be achieved with an arrangement in which the edge 9 is not disposed vertically above said centre line, or in which no edge 9 at all is used, provided that in such a case the chambers 6 and 7 are very narrow.

FIG. 2 represents the spinning device 1 with the partition 8 shown in broken lines and also the edge 9 and the spinneret orifices 10.

FIGS. 3 and 4 represent a composite filament 11 spun with the spinning device 1. The two constituents 12 and 13 making up the composite filament 11 can be made visible, for example, by means of phase contrast microscopy.

EXAMPLE I

A composite filament is spun with the use of the spinning device 1 shown in the drawing. Chamber 2 is charged with molten polyhexamethylene adipamide having a reduced viscosity of 1.04, and chamber 3 with a melt of polycaprolactam having a reduced viscosity of 0.945, the two polymers being fed in at the same rate per unit time. The two melts issue simultaneously from all spinneret orifices 10 into an atmosphere of a cooling gas, where they solidify to form the composite filaments 11, the two constituents 12 and 13 being joined together in each monofil along their longitudinal axes. The composite filaments are then reeled at a spinning rate of 920 metres per minute. The titre of the slack filaments 11 is 132 deniers and the yarn is made up of 13 monofils. These unstretched composite filaments (=filament A) have a "take-up" of 0%, that is to say they are completely smooth.

The unstretched filament A is stretched cold at a reeling rate of 188 metres per minute to 229% of its initial length (=filament B). This degree of stretch is the maximum possible under the conditions described. The cold-stretched filament B has a "take-up" of only 11% as shown in the table, that is to say, it has substantially no crimp at all.

Filament A is stretched at a temperature of 190° C. by contact with a heated surface at a reeling rate of 188 metres per minute to 330% of its initial length (=filament C), so that the elongation at rupture is identical with that of filament B. When the tension is taken off it, filament C undergoes spontaneous crimping and has then a "take-up" of 75%, as shown in the table. The "half-value decrimping force" is 1.3 mg. per denier, and the number of loops is 5.0 per cm.

The hot-stretched, spontaneously crimping filament C is heat-set by treatment with saturated steam of 123° C. under superatmospheric pressure in the slack state for 30 minutes (=filament D). The "half-value decrimping force" of this fixed filament D is 3.5 mg. per denier. The "take-up" is 77% and stays at substantially this value on storage. The treatment thus has the effect of development crimp directly and not merely a potential crimp which has to be developed subsequently. The number of loops is 4.7 per cm.

The salient features of the filaments A to D of this example are set out in the following table.

*Table I*

| Composite Filament | "Take-up" in percent | "Half-value decrimping force" in mg. per denier | Loops per cm. |
|---|---|---|---|
| A | 0 | | |
| B | 11 | | |
| C | 75 | 1.3 | 5.0 |
| D | 77 | 3.5 | 4.7 |

EXAMPLE II

The spinning device 1 used in Example I is supplied with equal amounts of two different polyamides. Chamber 2 is charged with polyhexamethylene adipamide having a reduced viscosity of 1.04, and chamber 3 with polyhexamethylene sebacamide having a reduced viscosity of 0.83. A composite filament is spun which has a titre of 385 denier in the slack state and is made up of 13 monofils, at a reeling rate of 460 metres per minute (=filament A). This composite filament has a "take-up" of 0%.

The composite filament A is stretched to 405% of its initial length at room temperature (=filament B). The "take-up" of this cold-stretched composite filament B is 0%.

The composite filament A is stretched at a temperature of 190° C. to 550% of its initial length (=filament C). This filament undergoes spontaneous crimping in the slack state. The "take-up" of this filament is 80%, the number of loops per cm. is 4.7, and the "half-value decrimping force" is 1.1 mg. per denier.

The hot-stretched composite filament C is heat-set by being boiled in the slack state for 30 minutes in boiling water (=filament D). The "take-up" of this filament is 78%, the number of loops per cm. is 5.5, and the "half-value decrimping force" is 3.5 mg. per denier.

The properties of the above filaments A–D summarised in the following table.

*Table II*

| Composite Filament | "Take-up" in percent | "Half-value decrimping force" in mg. per denier | Loops per cm. |
|---|---|---|---|
| A | 0 | | |
| B | 0 | | |
| C | 80 | 1.1 | 4.7 |
| D | 78 | 3.5 | 5.5 |

EXAMPLE III

The spinning device 1 shown in the accompanying drawing is used. Chamber 2 is charged with molten polyhexamethylene adipamide having a reduced viscosity of 0.965, and chamber 3 with molten polyethylene terephthalate having a reduced viscosity of 0.66, both polymers being supplied to the spinning device at the same rate. From the spinneret 1 a composite filament 11, whose constituents 12 and 13 lie side by side, is withdrawn through a current of cooling air and reeled at a rate of 920 metres per minute. The composite filament has a titre of 165 denier in the slack state and consists of 13 monofils. The slack composite filament is stretched to 410% of its initial length while heated by contact with a hot surface at 190° C. The hot-stretched filament (=filament A) undergoes spontaneous crimping when the tension is taken off and has a "take-up" of 60%, a "half-value decrimping force" of 1.3 mg. per denier and 5.8 loops per cm.

If the filaments made as described in this Example are stretched at temperatures below those specified for this invention, the two constitutents in the monofils undergo separation.

The hot-stretched, spontaneously crimped composite filament A is heat-set in the slack state for 30 minutes with saturated steam under superatmospheric pressure at 123° C. (=filament B). After this treatment the filament has a "take-up" of 74%, a "half-value decrimping force" of 3.1 mg. per denier and 7.2 loops per cm. The properties of the filaments A and B are summarised in the following table.

*Table III*

| Composite Filament | "Take-up" in percent | "Half-value decrimping force" in mg. per denier | Loops per cm. |
|---|---|---|---|
| A | 60 | 1.3 | 5.8 |
| B | 74 | 3.1 | 7.2 |

EXAMPLE IV

For the manufacture of a composite filament the spinning device 1 is charged with equal amounts of molten polyamide and polyester; chamber 2 is charged with polyhexamethylene adipamide having a reduced viscosity of 1.12 and chamber 3 with a copolyester of 90% polyethylene terephthalate and 10% of polyethylene isophthalate having a reduced viscosity of 0.63. The composite filament produce is ruled at a rate of 920 metres per minute. The composite filament (=filament A) has in the slack state a titre of 135 denier, is composed of 26 monofils and has a "take-up" of 0%.

The composite filament A is stretched to 336% of its initial length at a temperature of 185° C. (=filament B). This hot-stretched composite filament B undergoes spontaneous crimping in the slack state. It has a "take-up" of 75%, a "half-value decrimping force" of 1.8 mg. per denier and 7.9 loops per cm.

If such composite filaments of polyamide and polyester are stretched at a temperature below 175° C., one constituent becomes detached from the other.

The hot-stretched filament B is heat-set in the slack state for 30 minutes with saturated steam under superatmospheric pressure at 123° C. (=filament C). The heat-set filament has a "take-up" of 79%, a "half-value decrimping force" of 6.6 mg. per denier and 7.2 loops per cm.

The "half-value decrimping force" of filament C is comparable with that of a nylon 66 filament manufactured by high-twisting, fixing and back-twisting beyond the zero twist point (=crimped yarn D); it may for example be 7.0 mg. per denier and is better than that of a filament obtained by stuffing-box crimping and heat-setting (=crimped yarn E) which may have, for example, a "half-value decrimping force" of 4.0 mg. per denier.

Filaments A to E are compared in the following table.

*Table IV*

| Composite Filament | "Take-up" in percent | "Half-value decrimping force" in mg. per denier | Loops per cm. |
|---|---|---|---|
| Composite filament A | 0 | | |
| Composite filament B | 75 | 1.8 | 7.9 |
| Composite filament C | 79 | 6.6 | 7.2 |
| Crimped yarn D | 86 | 7.0 | |
| Crimped yarn E | 47 | 4.0 | |

I claim:

1. Process for the production of spontaneously crimping filaments, which comprises stretching filaments composed of two different mutually adherent fibre-forming polymers side by side along the length of the filaments one constituent being a polyamide and the other a different polymer selected from the group consisting of polyamides and polyesters, the stretching being carried out at a temperature below but at most 60° C. below the melting point of the lower melting constituents.

2. Process for the production of spontaneously crimping filaments, which comprises simultaneously melt-spinning two different mutually adherent fibre-forming polymers through the same spinning orifices, one of the polymers being a polyamide and the other a different polymer selected from the group consisting of polyamides and polyesters, so as to produce composite filaments having the two polymers arranged side by side along the length of the filaments and adherent to each other and thereafter stretching the filaments at a temperature below but at most 60° C. below the melting point of the lower melting constituent.

3. Process for the production of spontaneously crimping filaments, which comprises simultaneously melt-spinning two different mutually adherent fibre-forming polymers through the same spinning orifices, one of the polymers being a polyamide and the other a different polymer selected from the group consisting of polyamides and polyesters, so as to produce composite filaments having the two polymers arranged side by side along the length of the filaments and adherent to each other and thereafter stretching the filaments at a temperature below but at most 60° C. below the melting point of the lower melting constituent and releasing the tension to develop the crimp.

4. Process for the production of spontaneously crimping filaments, which comprises simultaneously melt-spinning two different mutually adherent fibre-forming polymers through the same spinning orifices, one of the polymers being a polyamide and the other a different polymer selected from the group consisting of polyamides and polyesters, so as to produce composite filaments having the two polymers arranged side by side along the length of the filaments and adherent to each other and thereafter stretching the filaments at a temperature below but at most 60° C. below the melting point of the lower melting constituent and releasing the tension to develop the crimp and heat-setting the filaments in the slack state.

References Cited by the Examiner

UNITED STATES PATENTS

| | | | |
|---|---|---|---|
| 2,386,173 | 10/45 | Kulp et al. | 18—8 |
| 2,439,814 | 4/48 | Sisson | 264—168 |
| 2,439,815 | 4/48 | Sisson | 264—168 |
| 2,931,091 | 4/60 | Breen | 264—171 |
| 2,987,797 | 6/61 | Breen | 264—168 |
| 3,038,235 | 6/62 | Zimmerman | 18—54 XR |
| 3,117,362 | 1/64 | Breen | 264—171 |

ALEXANDER H. BRODMERKEL, *Primary Examiner.*
MORRIS LIEBMAN, *Examiner.*

UNITED STATES PATENT OFFICE
CERTIFICATE OF CORRECTION

Patent No. 3,192,295            June 29, 1965

Walter G. Settele

It is hereby certified that error appears in the above numbered patent requiring correction and that the said Letters Patent should read as corrected below.

Column 6, line 58, for "produce is ruled" read -- produced is reeled --.

Signed and sealed this 14th day of June 1966.

(SEAL)
Attest:

ERNEST W. SWIDER
Attesting Officer

EDWARD J. BRENNER
Commissioner of Patents